US010263466B2

(12) United States Patent
Boys et al.

(10) Patent No.: US 10,263,466 B2
(45) Date of Patent: Apr. 16, 2019

(54) MAGNETIC FIELD SHAPING FOR INDUCTIVE POWER TRANSFER

(75) Inventors: John Talbot Boys, Takapuna (NZ); Grant Anthony Covic, Sandringham (NZ)

(73) Assignee: Auckland UniServices Limited, Auckland (NZ)

(*) Notice: Subject to any disclaimer, the term of this patent is extended or adjusted under 35 U.S.C. 154(b) by 872 days.

(21) Appl. No.: 14/240,191

(22) PCT Filed: Sep. 7, 2012

(86) PCT No.: PCT/NZ2012/000160
§ 371 (c)(1),
(2), (4) Date: Jun. 26, 2014

(87) PCT Pub. No.: WO2013/036146
PCT Pub. Date: Mar. 14, 2013

(65) Prior Publication Data
US 2014/0361630 A1      Dec. 11, 2014

(30) Foreign Application Priority Data

Sep. 7, 2011   (NZ) ........................................ 595056

(51) Int. Cl.
*H01F 27/42*      (2006.01)
*H01F 37/00*      (2006.01)
(Continued)

(52) U.S. Cl.
CPC ............. *H02J 50/10* (2016.02); *B60L 11/182* (2013.01); *B60L 11/1831* (2013.01);
(Continued)

(58) Field of Classification Search
CPC .......... H01F 38/14; H01F 38/00; H01F 21/06; H02J 7/00; H02J 7/02; H02J 17/00;
(Continued)

(56) References Cited

U.S. PATENT DOCUMENTS

2005/0116683 A1\* 6/2005 Cheng ....................... H01F 3/02
                                                             320/108
2007/0064406 A1\* 3/2007 Beart ....................... H01F 38/14
                                                             361/816
(Continued)

FOREIGN PATENT DOCUMENTS

WO   WO-1992/009969        6/1992
WO   WO-2008/140333       11/2008
(Continued)

OTHER PUBLICATIONS

"International Application PCT/NZ2012/000160, International Search Report and Written Opinion dated Dec. 3, 2012", (Dec. 3, 2012), 10 pgs.

*Primary Examiner* — Fritz M Fleming
*Assistant Examiner* — Jagdeep S Dhillon
(74) *Attorney, Agent, or Firm* — Schwegman Lundberg & Woessner, P.A.

(57) ABSTRACT

An IPT system magnetic flux device for generating or receiving a magnetic flux, has a magnetically permeable core and at least one coil magnetically associated with the core. A shield repels magnetic flux and is located on the opposite side of the core such that the shield includes an outer portion that extends beyond at least part of the perimeter of the core.

14 Claims, 10 Drawing Sheets

$Fe_w$  Ferrite width
$Fe_L$  Ferrite length
$\delta_{Al}$  Extended Rad.
$C_d$  Coil Dia.
$P_d$  Pad Diameter
$C_w$  Coil width 25 turn coil (Ø4mm Litz). 10mm thick ring
$I_1$ = 23A at 20kHz (51) Int. Cl.
*H01F 38/00* (2006.01)
*H02J 50/10* (2016.01)
*H02J 50/70* (2016.01)
*H01F 27/36* (2006.01)
*H01F 38/14* (2006.01)
*B60L 11/18* (2006.01)
*H02M 1/00* (2006.01)

(52) U.S. Cl.
CPC ........... *H01F 27/365* (2013.01); *H01F 38/14* (2013.01); *H02J 50/70* (2016.02); *B60L 2230/10* (2013.01); *H02M 1/00* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .. H02J 50/12; H02J 50/30; H02J 50/40; H02J 50/50; H02J 50/60; H02J 50/00; H02J 50/90; B60L 9/02; B60L 9/00; B60L 1/00; B60L 1/02; H02M 3/335; H04M 1/00
USPC ......... 307/9.1, 149, 104, 10.1; 320/107–109, 320/116, 119; 361/820, 818, 816; 336/182, 178, 180; 363/28, 30; 333/24 R, 20, 18; 191/10, 8
See application file for complete search history.

(56) References Cited

U.S. PATENT DOCUMENTS

| | | | |
|---|---|---|---|
| 2007/0188284 A1* | 8/2007 | Dobbs | A61B 6/56 336/120 |
| 2010/0081483 A1* | 4/2010 | Chatterjee | H01F 27/365 455/572 |

FOREIGN PATENT DOCUMENTS

| | | | |
|---|---|---|---|
| WO | WO-2010/090539 | 8/2010 | |
| WO | WO 2010090538 A1 * | 8/2010 | ............ B60L 11/182 |
| WO | WO-2011/016736 | 2/2011 | |
| WO | WO-2011/016737 | 2/2011 | |

* cited by examiner

FIGURE 16B: Double D pad with primary aluminium spacer and ends inverted

FIGURE 16C: Double D with primary Aluminium and ferrite to absorb negative flux

FIGURE 16D: Double D with primary Aluminium and split ferrite

FIGURE 16E: Double D with primary Aluminium and coaxial arrangement

FIGURE 16F: Double D with primary aluminium, and coaxial coils spaced apart

MAGNETIC FIELD SHAPING FOR INDUCTIVE POWER TRANSFER

PRIORITY CLAIM TO RELATED APPLICATIONS

The application is a national stage application under 35 U.S.C. § 371 of PCT/NZ2012/000160, filed Sep. 7, 2012, and published as WO 2013/036146 on Mar. 14, 2013, which claims priority to New Zealand Application No. 595056, filed Sep. 7, 2011, which applications and publication are incorporated by reference as if reproduced herein and made a part hereof in their entirety, and the benefit of priority of each of which is claimed herein.

FIELD OF THE INVENTION

This invention relates to apparatus and methods for shaping or directing magnetic fields generated or received by magnetic flux generating or receiving apparatus used in inductive power transfer (IPT) systems.

BACKGROUND

IPT systems are well known. As discussed in international patent application WO 2010/090539, it is necessary in some IPT applications, such as electric vehicle charging, to provide a loosely coupled system capable of operating with a large air gap between the magnetic flux transmitting and receiving structures.

Due to the potential for large scale deployment of both stationary charging and roadway powered electric vehicle applications, magnetic flux transmitting and receiving structures that operate efficiently with minimum use of materials are highly desirable.

Apart from efficiency, another issue with loosely coupled systems is elimination or control of stray magnetic fields which may pose health risks, and which in most countries are required to be controlled within certain limits by law.

SUMMARY

It is an object of the invention to provide an improved apparatus or method for inductive power transfer, or an improved IPT power transfer pad, or to at least provide the public or the industry with a useful alternative.

Accordingly one aspect the invention broadly provides an IPT system magnetic flux device for generating or receiving a magnetic flux, the device comprising a magnetically permeable core means and at least one coil magnetically associated with the core means, and a shield means which repels magnetic flux provided on the opposite side of the core means such that the shield means includes an outer portion that extends beyond at least part of the perimeter of the core means the shield means comprises a sheet material.

Preferably the device comprises a pad.

Preferably the outer portion has a peripheral edge, and there is a gap between the core perimeter and the peripheral edge. In one embodiment the gap may be filled or partially filled with a non-magnetic material.

In one embodiment the outer portion extends from the pad substantially in the plane of the core, and the peripheral edge is provided at an angle relative to the outer portion. In one embodiment the angle is substantially 90 degrees such that the peripheral edge substantially comprises a lip. In other embodiments the peripheral edge is disposed at an angle greater then 90 degrees relative to the outer portion, for example at an angle between substantially 90 degrees and 150 degrees relative to the outer portion.

In one embodiment the outer portion substantially circumscribes the core.

Preferably the outer portion further comprises a flange peripheral of the lip. In one embodiment said flange is in a plane substantially parallel to the first portion.

Preferably the coil is a substantially planar coil.

Preferably the coil is provided on the side of the core opposite to the shield.

In a further embodiment the shield further comprises a cage. The cage is adapted to receive one or more windings. In one embodiment the cage comprises a box section.

Preferably the sheet material comprises a plate.

Alternatively the sheet material comprises a mesh material.

Alternatively the sheet material comprises one or more sections of plate and one or more sections of mesh.

Preferably the sheet material includes a flange which extends beyond the perimeter of the core.

Preferably the core has a longitudinal axis and the outer portion of the shield extends beyond each longitudinal end of the core.

Preferably the sheet material is constructed from aluminium.

According to a further aspect of the invention, there is provided an IPT system magnetic flux pad for generating or receiving a magnetic flux, the pad comprising a magnetically permeable core means and at least one coil magnetically associated with the core, and a cage means adapted to receive one or more windings of the coil.

Preferably the cage is provided on a first side of the core, such that one or more turns of the coil on the first side of the core pass through the cage.

Alternatively the cage is provided at one end of the core, a further cage means is provided at an opposite end of the core and a further coil is provided whereby one or more turns of the coil pass through the cage means and one or more turns of the further coil pass through the further cage means.

Further aspects of the invention will become apparent from the following description.

BRIEF DESCRIPTION OF THE DRAWINGS

One or more embodiments of the invention will be described below with reference to the accompanying drawings in which:

FIGS. 2A & B are graphs showing variation in $P_{su}$ and mutual inductance for two identical coupled pads having the same inductance for variations in the ratio of coil diameter with respect to pad diameter;

DESCRIPTION OF ONE OR MORE PREFERRED EMBODIMENTS

As discussed above, the magnetic structures or devices that are used to generate and receive magnetic flux in order to provide coupling between the primary and secondary circuits of an IPT system may take a variety of forms. The structures are often referred to as pads since they usually extend further in two dimensions than the third dimension. The third dimension is usually a thickness which is intended to be minimised so that the pad structure can be incorporated in the other side of a vehicle and/or in a roadway, a parking space and a garage floor for example.

Figure 1:
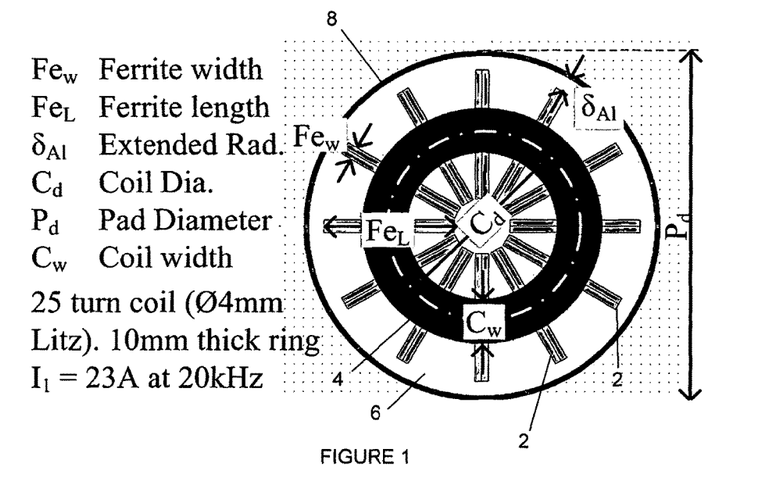
FIG. 1 is a plan view of a circular inductive power transfer pad.

One known pad structure is disclosed in WO 2008/140333 which is generally circular in design. FIG. 1 shows a layout for a circular power pad. As can be seen from that figure, the core structure comprises a number of radially directed strips 2 of magnetically permeable material such as ferrite. In one example, a pad measuring 700 millimetres in diameter (Pd in FIG. 1) has been built using readily available I93 cores (three per radial strip). One or more substantially planar coils 4 are located on top of the core structure. On the opposite side of the core structure (i.e. underneath) is provided shielding comprising a backing plate 6 made of a sheet material, preferably aluminium, which has a peripheral edge in the form of a ring 8 (i.e. an upwardly directed flange) at the periphery of an outer portion ($\delta_{Al}$) of the shield. The aluminium backing 6 and ring 8 add robustness and provide shielding around the pad to leakage fluxes which may exist. Unlike the pad in FIG. 1, the ring 8 in prior art circular pads is located immediately adjacent to the edge of the core i.e. the outer end of each radial ferrite strip 2.

Symbols in FIG. 1 are as follows:
$Fe_w$ Ferrite width
$Fe_L$ Ferrite length
$\delta_{Al}$ Extended Rad.
$C_d$ Coil Dia.
$P_d$ Pad Diameter
$C_w$ Coil width
25 turn coil (Ø4 mm Litz). 10 mm thick ring
$I_1$ 23 A at 20 kHz The material from which the backing structure 6 and ring 8 is constructed is preferably one which repels magnetic flux. The material is also preferably a good conductor and not lossy. The backing 6 may comprise a plate material or a mesh material e.g. aluminium plate or aluminium mesh. Also, the backing material may comprise a combination of materials, for example a plate that supports the core, and a mesh section that extends beyond the core perimeter. Advantages associated with use of a mesh material include lower cost, improved integration with the surrounding substrate (in a roadway application for example) and improved transfer of heat from the structure to the surrounding environment.

We have found that placing the ring 8 close to the core periphery reduces leakage flux, but is not ideal because it has an adverse effect on coupling. As discussed further below, extending the ring 8 and backing plate 6 beyond the outer periphery of the core can lead to optimizing coupling for a given field leakage.

Our previous work has shown that the ideal coil diameter of the circular pad is 57% of the pad diameter that includes an aluminium ring. To investigate further, a simulation has been performed in which the coil diameter (Cd) was varied on a 700 millimetre diameter pad with an aluminium ring (R), and without an aluminium ring (NR), at a vertical separation of 125 mms.

The results are shown in FIGS. 2a and 2b which show the $P_{su}$ (open circuit voltage multiplied by short circuit current) and coupling factor k. The assumption is that the transmitter and receiver pads are both identical and have the same inductance. As can be seen, there is a significant increase in power if the ring is removed. For a pad without a ring a core diameter of 416 mm (approximately 60% of the pad diameter) is a good compromise between the power transferred and the coupling co-efficient. As shown in FIG. 2b, the pad self inductance drops sharply as the coil gets very close to the ring, whereas it drops relatively slowly if the ring is removed. The ring effectively cancels the flux from the coil due to opposing flux from any currents that reduce the inductance.

When the coil is roughly centred on a pad with a ring (~0.55<$C_d/P_d$<~0.7), flux is able to enter and exit from the ends of the ferrite resulting in increased inductance. For a pad without a ring, the maximum inductance results with a $C_d$ of 200 mm however it appears that the flux on the outside edge of the coil only has a small area through which it can enter the ferrite strip—the ferrite distribution is not radially symmetrical about the coil. This can be explained in terms of inductance that determines how much energy a pad can store in its magnetic field. Flux lines tend to arrange themselves to minimize energy storage by traversing the paths of least reluctance. There is no flux out the back of the pads due to their construction; a coil sits on ferrite that sits on a layer of aluminium shielding. Assuming $C_d$ is less than its ideal value, the flux lines would repel each other more on the inside of the coil because there is less volume for the flux on the inside of the coil (the number of flux lines linking the coil is constant). With $C_d$ optimized, the overall field "repulsion" is minimized due to the increased volume on the inside of the coil thus the stored energy and hence inductance for this particular arrangement is maximized.

Figure 2:
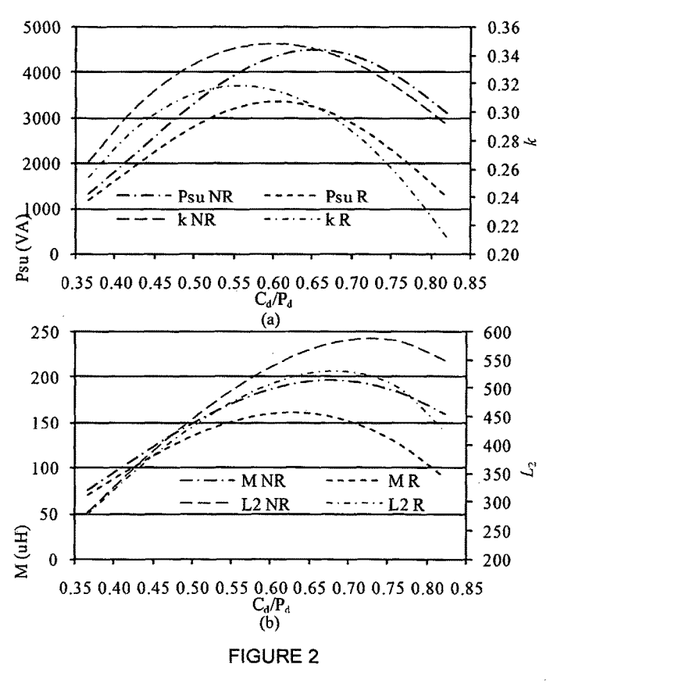
Figure 3:
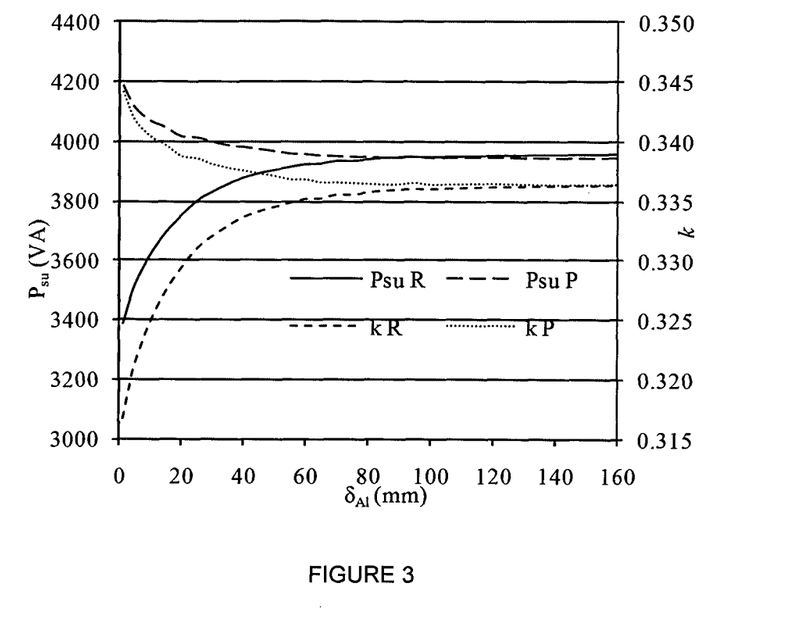
FIG. 3 is a graph showing variations in $P_{su}$ with the outer portion ($\delta_{Al}$) i.e. the distance between the core periphery and the outer pad diameter defined by the backing plate or shield.

The results shown in FIG. 2(b) indicate that pad inductance drops when a ring is added due to a flux cancelling effect. Reducing flux leakage at the expense of power transfer is often necessary to ensure high power systems are able to meet magnetic field leakage standards. Thus, in order to separately determine the effect of the ring and backing plate on power transfer, simulations were undertaken where the outer portion of the sheet material beyond the core periphery ($\delta_{Al}$) was varied with and without a ring. $P_{su}$ and k profiles are shown in FIG. 3. Here the label "R" implies both the backing plate and ring are present while the label "P" indicates only the extended backing plate is present. M represents mutual inductance between transmitter and receiver pads, and L2 represents the inductance of the receiver pad. Placing the ring close to the ends of the ferrite significantly reduces performance given $P_{su}$ increases by ~27% when it is removed. Pads with and without rings reach a $P_{su}$ of 3.9 kVA however by this point the diameter has increased by 170 mm.

The $P_{su}$ profiles diverge slightly when $\delta_{Al}$>100 mm showing the ring has a slight 'flux catching' effect. An outer portion $\delta_{Al}$ of 40 mm is therefore suggested for the optimized pad because there is little increase in performance and smaller pads are preferable.

Figure 4:
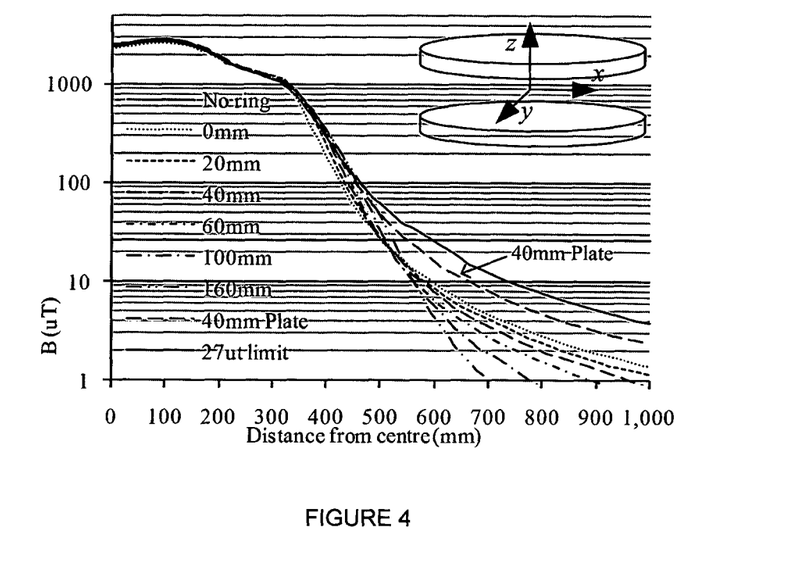
FIG. 4 shows B as a function of distance for the pad of FIG. 1.

Magnetic field leakage has been investigated by simulation since simulation results have been shown to match experimental results to within a few percent. Here a transmitter pad is excited with a sinusoidal 23 A current at 20 kHz and an open circuit receiver pad is placed 125 mm above it. The magnetic flux density is recorded along a 1 m contour extending from the centre of the air gap between the pads outward. The flux density is significantly lower above the receiver (being the upper pad) and below the transmitter due to shielding from the aluminium backing plate. The results are shown in FIG. 4 where various field leakage curves are plotted. The first labelled "No ring" shows the output without a ring and having $\delta_{Al}$=0. This is compared against other designs with the ring in place but having increasing values for $\delta_{Al}$. The '40 mm Plate' contour (having $\delta_{Al}$=40 mm without the ring) is also added since this was described as ideal from a power perspective. Removing the ring increases flux leakage substantially as does placing it very close to the ferrite ends. A larger backing plate attenuates leakage slightly but a ring is required for the greatest reduction. Field leakage reduces as $\delta_{Al}$ increases but this increases $P_{su}$ favourably (as shown in FIG. 3). In a receiver pad the upper limit of outer portion $\delta_{Al}$ is determined by the maximum space available on an EV chassis and the extra cost for the additional aluminum. The flux vectors in FIG. 2(*a*) show the ring creates a higher reluctance path by causing the field to bend thereby reducing leakage. This 'flux catching' approach results in lower power transfer. Therefore a plate without a ring provides a compromise between leakage and coupling. Flux is easily able to enter the ferrite strips through their ends resulting in increased power.

The measurements in FIGS. 2, 3 and 4 illustrate pad sensitivity to metallic objects in the vicinity of the pad. The chassis of an EV is typically made out of steel and this can severely reduce the quality factor of the receiver or transmitter pads $Q_L$ (where $Q_L$ is the reactance of the coil divided by its resistance at the frequency of operation). Larger leakage results in more energy lost in the surrounding EV chassis—this loss is proportional to $B^2$, thus slight reductions in flux density can be very effective. FIG. 4 shows that the ring reduces the area through which flux can escape, but the flux that does escape tends to curve inwards to the opposite pad. Consequently, this flux leakage is less likely to run parallel to the surrounding chassis. Conversely, when the ring is removed as shown in FIG. 2(*b*) (the back plate is still present), this shaping of the flux path is reduced, and flux is allowed to travel unimpeded toward the chassis, resulting in larger leakage and hence larger loss.

Thus in some applications, simply providing a shielding plate with a flange that extends beyond a perimeter of the core may be advantageous. Also, providing a lip (such as a ring) so that the flange structure provides a recess or gap between the core and the lip can also be advantageous.

The International Commission on Non-Ionizing Radiation Protection (ICNIRP) has produced guidelines that prescribe limits to human exposure to time varying magnetic fields. The body average limit is 27 µT in the range of 3 kHz-10 MHz (though above 100 kHz RF specific levels must be considered). Spot limits can be greater, but their magnitude must be defined by the standards bodies for each country. The 700 mm circular pads with a ring positioned with a $\delta_{Al}$ of 40 mm have spot values less than 27 µT at points greater than 500 mm away from the pad centre and therefore the body average will be significantly lower. This spot value of 27 µT is reached at a distance of ~540 mm if the ring is removed ($\delta_{Al}$=40 mm) and at ~600 mm if the ring is removed from the original pad ($\delta_{Al}$=0 mm). These distances are easily acceptable given the width dimensions of typical vehicles, however if higher power levels over larger air gaps are required the ring may need further extension.

Double D Topology

Figure 5:
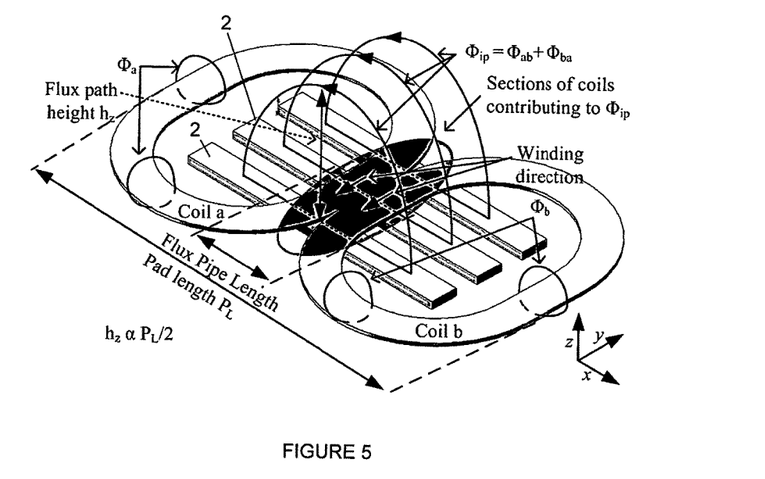
FIG. 5 is perspective view of a Double D pad.

Another pad topology which eliminates unwanted rear flux paths by placing two coils above (rather than around) the ferrite strips 2 which form the core, is shown in FIG. 5. The ferrite channels the main flux behind the coils (referenced a and b) and forces the flux to establish itself on one side, being the side on which the coils are located. Therefore, any aluminum (not shown in FIG. 5) provided beneath the core only needs to shield stray fields, resulting in negligible loss. The ideal flux paths are shown in FIG. 5 arching above the pad. These paths allow good coupling to a similar shaped receiver because the fundamental height ($h_z$) is essentially proportional to ½ of the pad length. A key feature to achieving a high coupling factor between two power pads is the intra-pad coupling. The height of the intra-pad flux ($\Phi_{ip}$) is controlled by adjusting the width of the coils a and b in the region where they are immediately adjacent to each other. This region is shaded in FIG. 5, and referred to as a "flux pipe" between coil a and coil b. The fraction of flux $\Phi_{ip}$ that couples to the receiver pad is mutual flux ($\Phi_M$) therefore the section of coil forming the flux pipe should ideally be made as long as possible. Conversely, the remaining length of the coil should ideally be minimized to save copper and lower $R_{ac}$. Doing so results in coils shaped like a "D" and since there are two such coils placed back to back, the pad is referred to as a Double D (DD) structure in this document.

Again, a backing structure may be used to control the shape of the field in front of the pad and/or to eliminate any fields that happen to propagate around the sides or rear of the pad. The effect of such a backing structure or flux shaping structure on the DD pad, and variants of that pad, are discussed below.

Figure 13:
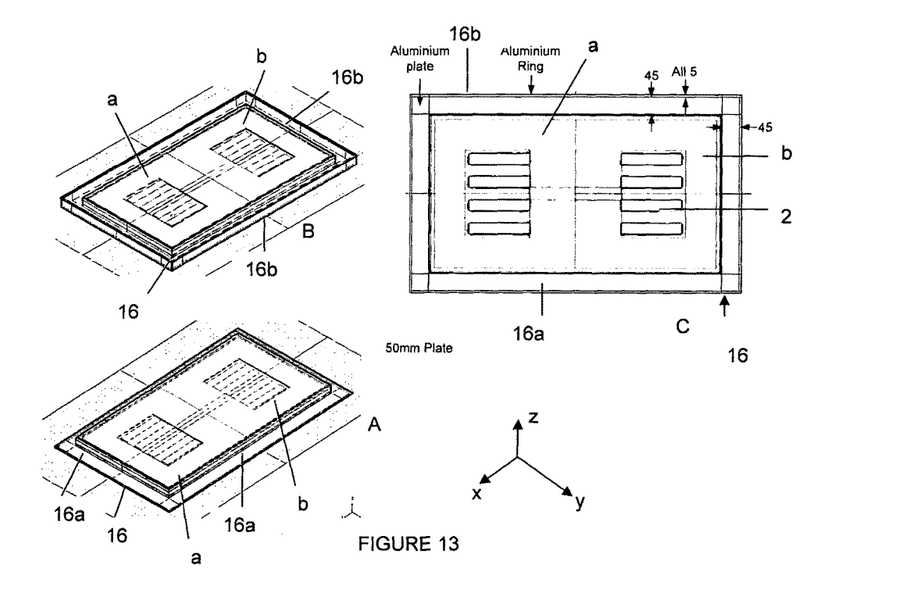
FIG. 13 shows a pad structure for a Double D pad.

The effect of a simple planar outer portion extension of the aluminium backing plate about the perimeter of a DD pad structure has been investigated, along with the provision of a peripheral edge such as a ring (in the form of an upstanding, angled or vertical lip provided as part of an extended flange). Referring to FIG. 13A, a design of DD pad for which the backing or shielding plate 16 has an extended flange 16*a* of 50 mm is illustrated. FIG. 13B shows the further addition of a ring 16*b* of 5 mm thickness. A plan view which includes dimensions (in mm) of the simulated structures is shown in FIG. 13C. The structure of the DD transmitter has 4 rows of 6 ferrite slabs, while the receiver has 4 rows of 8 ferrite slabs. The air gap between the transmitter pad and receiver pad is 125 mm with no offset.

Figure 14:
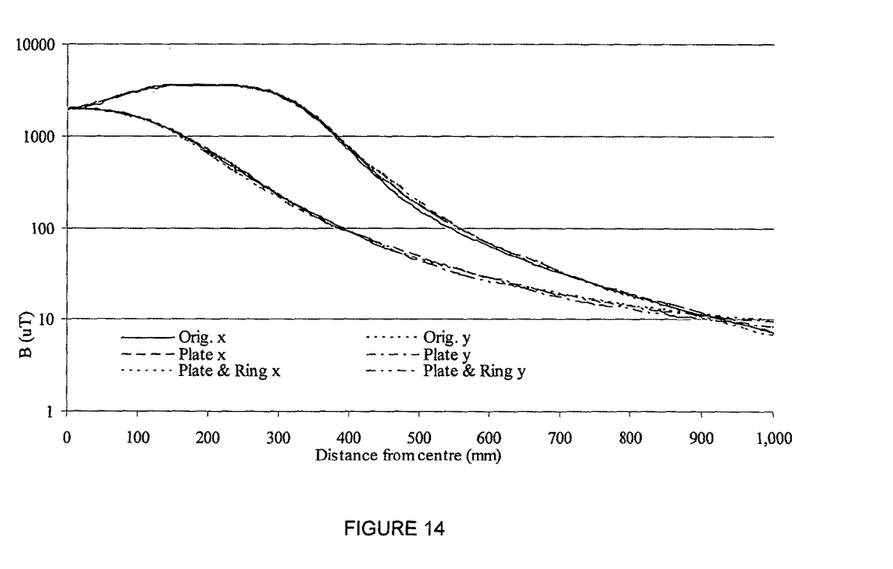
FIGS. 14 & 15 show variation in B with distance for pad structures of FIGS. 13B and 13C compared with a structure having a backing plate or shield which does not extend beyond the core periphery.
Figure 15:
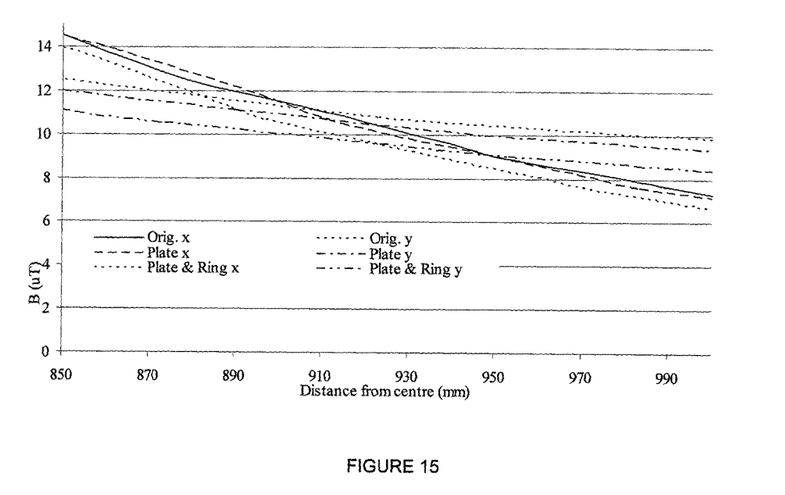

As shown in FIGS. 14 and 15, the pad structures of FIGS. 13B and 13C were compared with a structure for which the backing plate did not have a ring and did not extend beyond the core (referred to in FIGS. 14 and 15 as "Orig"). We found that extending the aluminium improves power transfer by 2.5%, while extending the aluminium and adding a ring improves power transfer by 5%. Both extensions help the far field magnetic leakage. However, the field in the centre is not changed significantly—as expected given that the power improves.

To compare other possible design modifications for the DD pad structure, two main quantities were measured from JMAG simulations. The Isc was measured to quantify the power capability ($P_{su}$) and the leakage field (B_leakage) was taken at 1 m from the centre of the pad in the plane of the pad.

However, when the designs are optimised, these variables vary significantly. As there are two variables that are changing, it is often difficult to fully quantify the overall effect of the optimisation process. Hence, the results are modified so that only one of these variables changes at a time. This is done by scaling the track current so that the leakage field at 1 m is maintained at a constant level. For example, as a certain design parameter is varied, the Isc and B_leakage are obtained. Following this, the track current is scaled appropriately so the leakage field is maintained at a reference level. This reference level is set to be the leakage field produced by a standard Double D pad. As a result, the various proposed designs can be easily compared to the existing Double D pads. It should be noted, that as a result of the scaling of the track current, the $P_{su}$ of the system is also scaled correspondingly. The next section shows the various designs that were considered.

Double D Coax (Starting Point)

Figure 6:
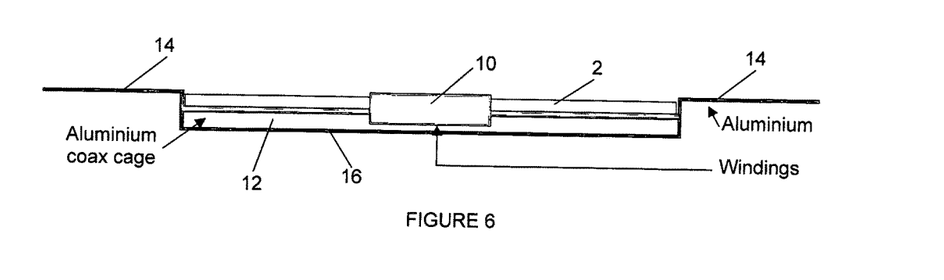
FIG. 6 is an elevation in cross section showing one embodiment of a pad structure.
Figure 7:
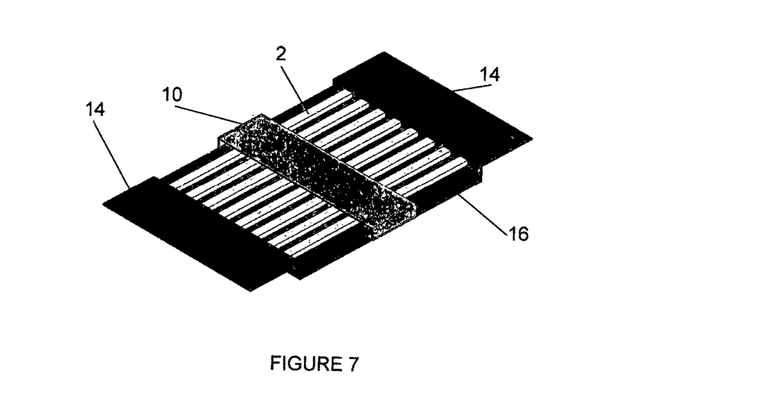
FIG. 7 is a perspective view of the pad of FIG. 6.

A coaxial winding 10 was wound about the core 2 so that the return conductors are shielded using a cage 12 formed in the backing/shielding plate 16. The plate 16 extends beyond the periphery of the core 2 at the longitudinal ends of the core, forming flanges or end plates 14. The design aims to have almost circular flux paths so that maximum flux path height and coupling can be achieved. The design is presented in FIGS. 6 and 7.

Double D Coax Hybrid

Figure 8:
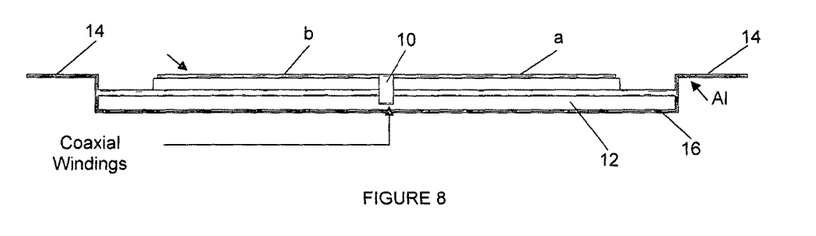
FIG. 8 is an elevation in cross section showing another embodiment of a pad construction.
Figure 9:
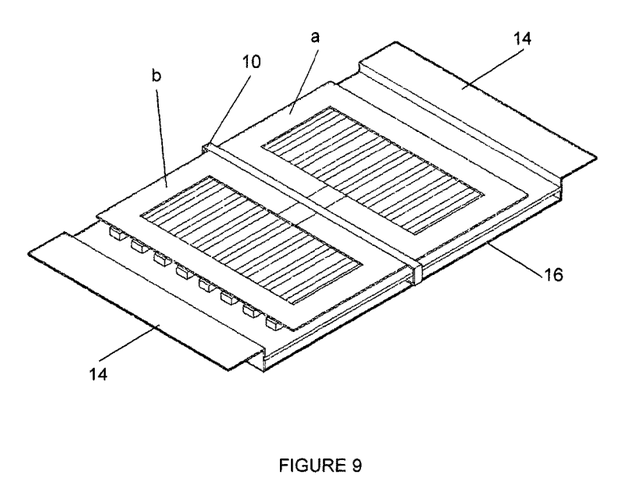
FIG. 9 is a perspective view of the construction of FIG. 8.

Following this a further modification was proposed, and is shown in FIGS. 8 and 9. This design contains the coaxial winding that goes through the coaxial cage (similar to the Double D Coax of FIGS. 7 and 8), as well as Double D windings (similar to the windings a and b of the Double D structure referred to above with reference to FIG. 5). The design shown in FIGS. 8 and 9 aims to use the Double D windings to further shape the fields and hence increase coupling and reduce leakage fields.

Figure 10:
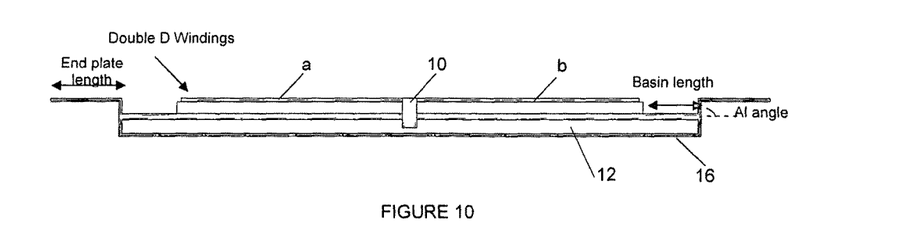
FIG. 10 shows an elevation in cross section for the pad shown in FIGS. 8 and 10, but identifies dimensions for the shield structure.

From this design, an optimisation process was undertaken. In the optimisation process, several parameters were varied and their effects were quantified. The parameters that were varied are shown graphically in FIG. 10. As a result the coaxial winding 10 was removed, and the optimum values chosen are summarised below:

Number of Double D windings (optimum N=20, i.e. similar winding to current Double D of FIG. 5)

Aluminium (i.e. backing) lengths (optimum basin length=75 mm, aluminium angle=45 deg and the endplate length=50 mm).

Figure 11:
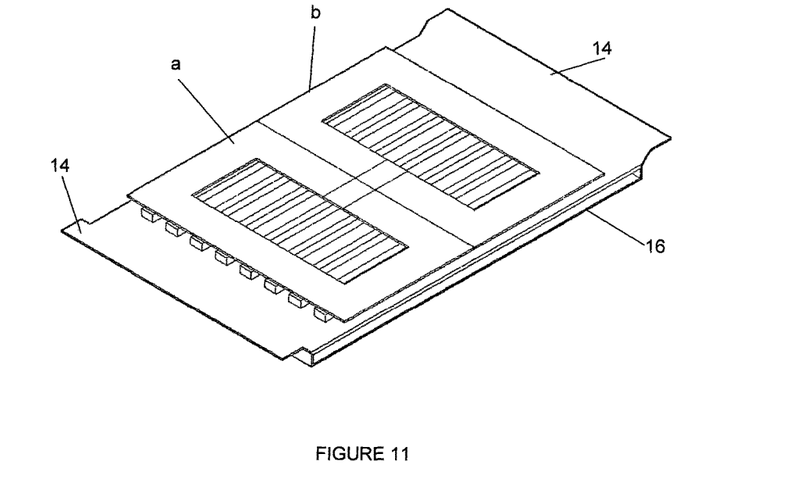
FIG. 11 is a perspective view of a further pad structure.

The design resulting from the optimisation process is shown in FIG. 11. Thus the aluminium provides an outer portion with an upwardly directed lip, and a flange peripheral from or dependent from the lip. Although shown, the cage is not required in the FIG. 11 construction.

Results

Figure 12:
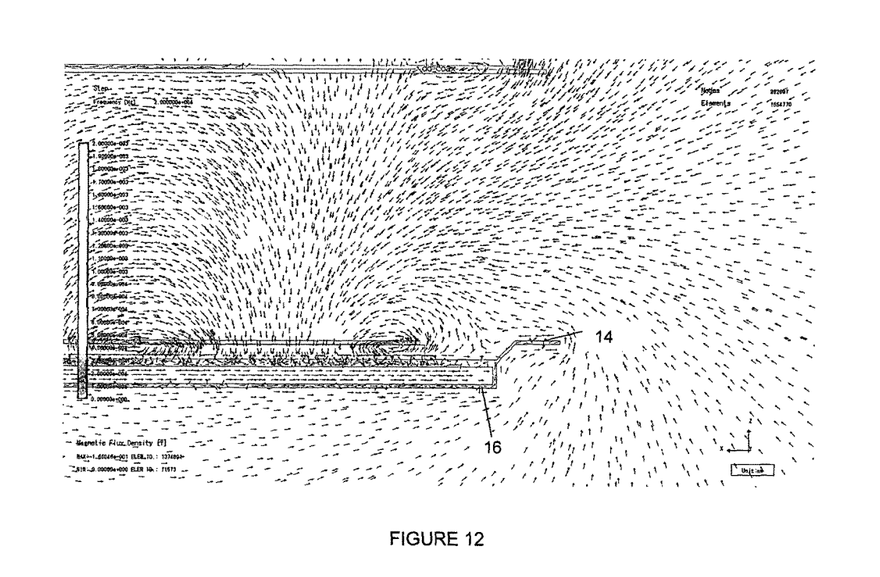
FIG. 12 is a partial cross section showing the pad structure of FIG. 11 and the field when the pad is energised.

FIG. 12 shows the resulting flux density plot for the design of FIG. 11. The backing structure (aluminium sheet material) plays an important part in shaping the fields through the induction of eddy currents in the aluminium structure.

Using the approach outlined earlier, the proposed design was compared to the present Double D pad. The results are as shown below:

|  | Psu for same B_leakage as present Double D (VA) | % Increase in Psu for same B_leakage as present Double D (%) | B_leakage (at 1 m) with track current scaling (T) |
| --- | --- | --- | --- |
| Present Double D (FIG. 5 Structure) | 1235.154 | 0 | 2.4350E−05 |
| Proposed Design (FIG. 11 Structure) | 2369.314 | 91.823 | 2.4350E−05 |

It can be seen that the design of FIG. 11 provides a significant increase in the amount of power that can be coupled across the air gap for the same B_leakage as the Double D structure of FIG. 5. This result is a little misleading as most of the improvement comes about from the increase in the number of rows of ferrite from 6 in FIGS. 5 to 8 in FIG. 11, but the flanges add another 10-15%.

We now consider other coil and aluminium shielding arrangements for the general double D structure with reference to FIGS. 16A-16F. In these figures the two coils are each wound as a flat spiral but are shown here as a 2 dimensional cross section. Each coil comprises 20 turns, so there are 40 wires in the central flux pipe. The wires in the flux pipe i.e. between the pole area are all placed with centres 6.6 mm apart, and the end windings 21, 22 in the coils (i.e. those windings at the longitudinal ends of the core) are 20 turns spaced with centres 4 mm apart (essentially touching). This arrangement without any aluminium shielding and with the end windings located beyond the ends of the core 2 produces the flux pattern (the curved lines 18 about the cross section through the pad structure) of FIG. 16A. This flux pattern is very high but has spillage of flux out the ends of the coils. Here the height and spillage are both amplified by having no ferrite under the end windings. In practice this spillage flux is undesirable, for reasons set out earlier in this document, and is very difficult to reduce.

Figure 16A:
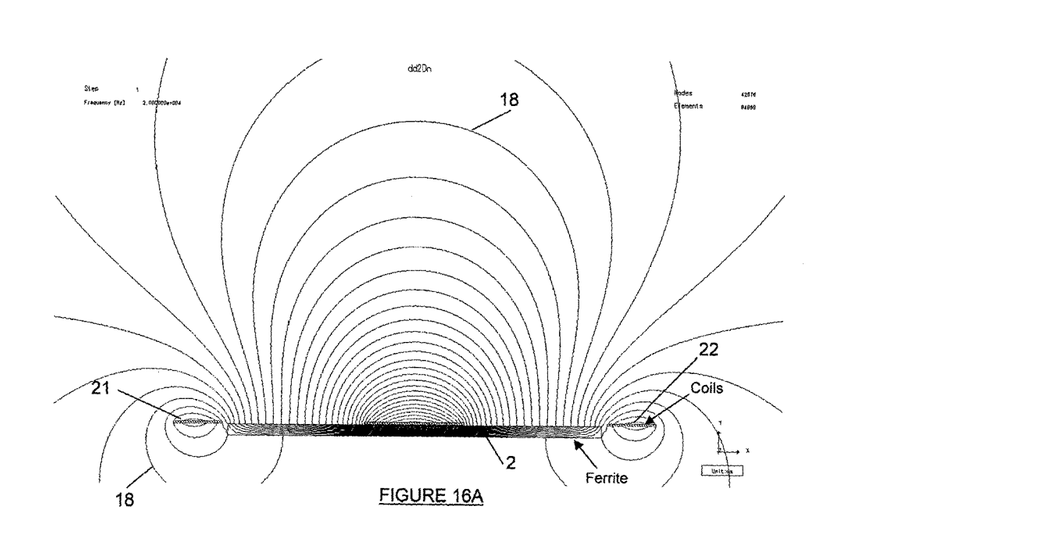
FIGS. 16A to 16F show elevations in cross section through a variety of different pad embodiments, and representations of the magnetic field generated by each embodiment.
Figure 16B:
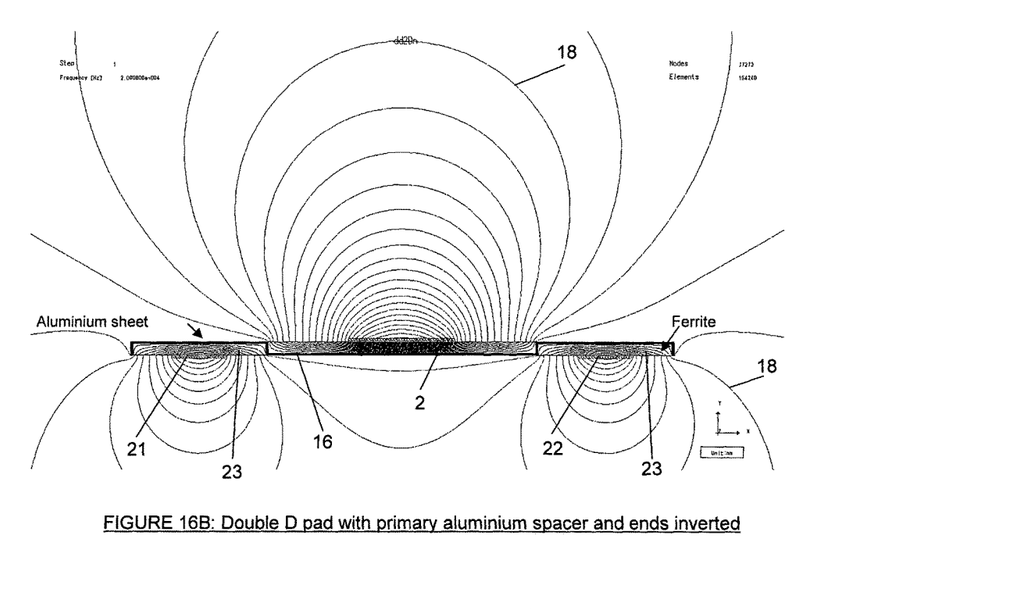

In FIG. 16B ferrite 23 has been placed on top of the end windings 21, 22. An aluminium separator 16 formed from sheet material has been added to prevent a magnetic short circuit condition. The aluminium is located behind core 2 and flanges extend beyond the periphery of the core at the longitudinal ends of the core. As shown in FIG. 16B the flux path is essentially ideal above the ferrite but has some serious undesirable end fluxes below the bottom of the pad. With eight ferrite cores in the pad the aluminium 16 transitions between the third and fourth cores, and between the sixth and seventh cores, and covers the ends of the first and eighth cores. In this way the flux pattern of FIG. 16B is almost the same as 16A apart from these end fluxes.

Figure 16C:
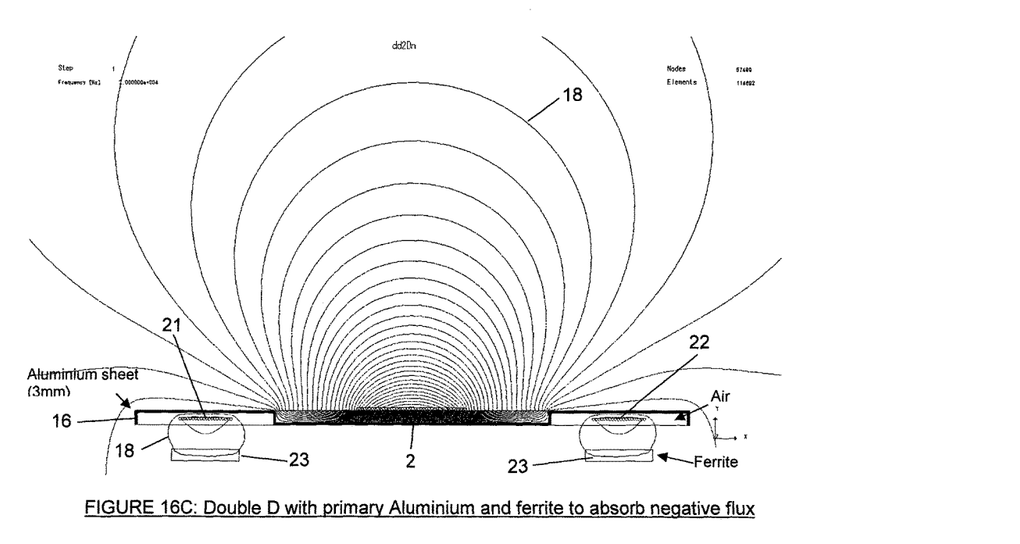

In FIG. 16C the ferrite 23 has been removed and placed below the end windings 21, 22 which are surrounded by air. The resultant flux pattern shows that adding adjacent ferrite cores can absorb the unwanted end fluxes very easily.

Figure 16D:
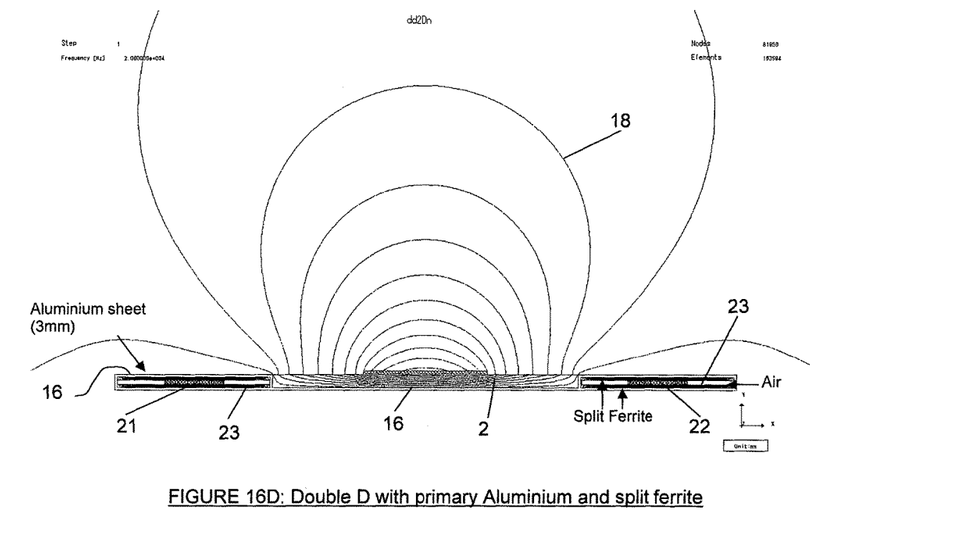

In FIG. 16D the aluminium plate 16 has been altered so that the flange portions provide a coaxial cage at each end. The ferrite 23 is split to be above and below the end windings 21, 22, and the ferrite and end windings are provided within the cage areas. Here the ferrite associated with the end windings has a gap in it. If the gap is not there and the whole space except the winding was filled with ferrite then the inductance of the end windings would be very high but the gap may be varied from a small gap to no ferrite at all to control the effect of the end windings on the flux pattern. As shown in FIG. 16D, the unwanted end fluxes are substantially eliminated.

Figure 16E:
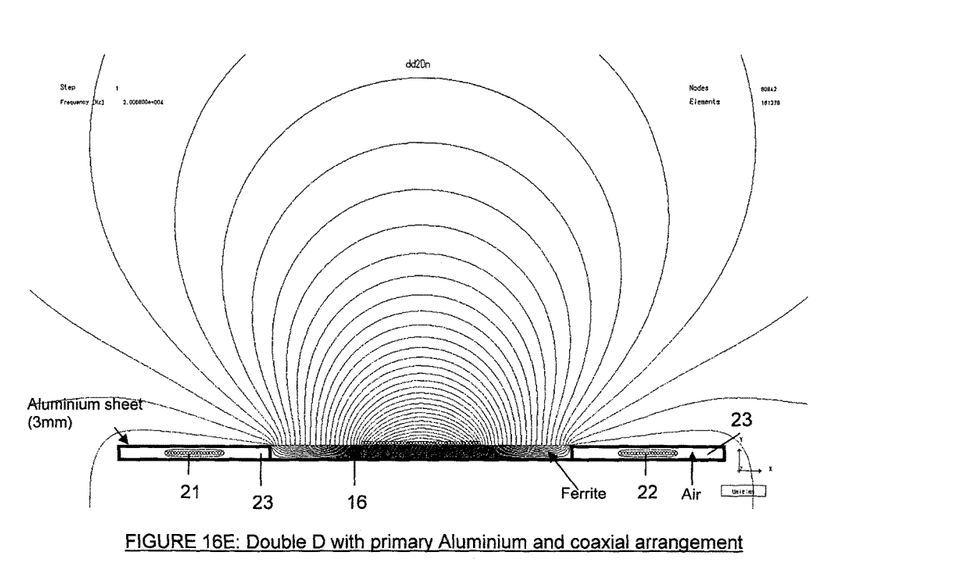
Figure 16F:
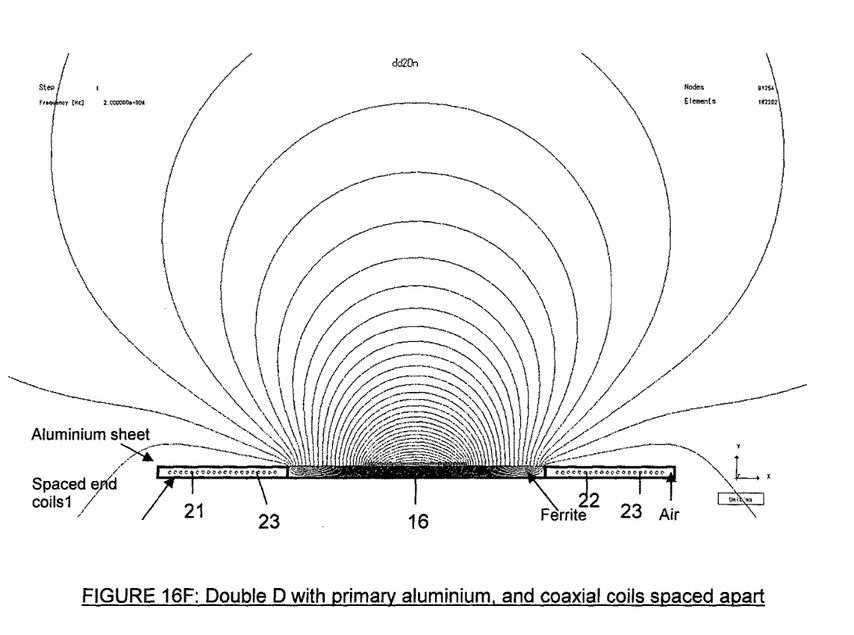

Turning to FIG. 16E, the ferrite 23 has been removed so that the end windings 21, 22 are located in air within the cage areas. The flux pattern produced is very nearly an ideal flux pattern but the losses in the aluminium 16 may be high. The losses may be reduced by spreading the end windings 21, 22 over a longer length as shown in FIG. 16F to get an excellent flux pattern.

The addition of an extended aluminium shield and flange is also helpful in other transmitter and receiver topologies such as the bipolar topology described in WO 2011/016737.

The invention claimed is:

1. An IPT system magnetic flux device for generating or receiving a magnetic flux for coupling with another device to transfer power inductively, the magnetic flux device comprising:
    a magnetically permeable core;
    at least two coils provided on a first side of the core and magnetically associated with the core; and
    a flux shaping structure for shaping the magnetic flux for coupling provided on a side of the core opposite to the first side, the flux shaping structure comprising an outer portion that extends beyond at least part of the perimeter of the core, and a lip extending from the outer portion at an angle greater than 90 degrees relative to the outer portion,
    wherein the at least two coils are substantially on the same plane.

2. The IPT system magnetic flux device as claimed in claim 1 wherein the outer portion has a peripheral edge, there is a gap between the core perimeter and the peripheral edge, and the gap is filled or partially filled with a non-magnetic material.

3. The IPT system magnetic flux device as claimed in claim 1 wherein the angle is between substantially 90 degrees and 150 degrees relative to the outer portion.

4. The IPT system magnetic flux device as claimed in claim 1 wherein the outer portion substantially circumscribes the core.

5. The IPT system magnetic flux device as claimed in claim 1 wherein the flux shaping structure further comprises a cage for shielding a conductor of at least one of the coils.

6. The IPT system magnetic flux device as claimed in claim 5 wherein the flange comprises a wall of the cage.

7. The IPT system magnetic flux device as claim 1 wherein the device comprises a pad.

8. The IPT system magnetic flux device as claimed in claim 1 wherein the outer portion extends from the device substantially in a plane of the core.

9. The IPT system magnetic flux device as claimed in claim 3 wherein a flange extends from the lip.

10. The IPT system magnetic flux device as claimed in claim 9 wherein the flange is in a plane substantially parallel to a plane that the outer portion lies within.

11. The IPT system magnetic flux device as claimed in claim 10 wherein the flange extends from the lip substantially adjacent to the first side of the core.

12. The IPT system magnetic flux device as claimed in claim 11 wherein the outer portion extends from longitudinal ends of the core.

13. The IPT system magnetic flux device as claimed in claim 1 wherein the flux shaping structure is provided as a layer.

14. The IPT system magnetic flux device as claimed in claim 1 wherein the core comprises pieces of magnetically permeable material.

* * * * *